UNITED STATES PATENT OFFICE 2,182,348

POLYAZO DYE

Arthur R. Murphy, deceased, late of Penns Grove, N. J., by Margaret R. Murphy, administratrix, Penns Grove, N. J., and Henry Jordan, Wilmington, Del., assignors to E. I. du Pont de Nemours & Company, Wilmington, Del., a corporation of Delaware No Drawing. Application September 1, 1937, Serial No. 161,964

14 Claims. (Cl. 260—144)

This invention relates to new polyazo dyes which are especially useful for dyeing cotton, regenerated cellulose and similar materials and produce dyeings having good discharge and fastness properties, especially superior fastness to washing; to fabrics dyed with the dyes; and to methods of making the dyes and dyeings.

It is an object of the invention to provide polyazo dyes which give dyeings of good strength, excellent fastness to washing and good discharge properties and which are especially useful for dyeing cotton, regenerated cellulose and similar textile materials. Another object of the invention is to provide textiles dyed with the new dyes. Another object of the invention is to provide processes for making the dyes and the dyeings thereof. Still other objects of the invention will be apparent from the following description.

The objects of the invention are attained in general by coupling an azo dye coupling component with a diazotized compound having the general formula

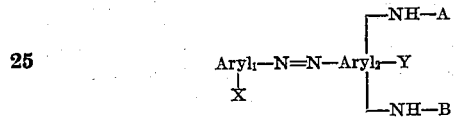

in which $Aryl_1$ is benzene, benzidine or naphthalene; X is at least one of the group consisting of hydrogen, alkyl, alkoxy, hydroxy, amino, carboxy, sulfonic acid, and azo- and poly-azo groups of benzene and naphthalene compounds; $Aryl_2$ is a benzene or naphthalene nucleus having —NH— groups in alternate positions; Y is at least one of the group consisting of hydrogen, alkyl, alkoxy, halogen, carboxy and sulfonic acid; A is one of the group consisting of hydrogen, meta-amino-benzoyl and para-amino benzoyl; and B is one of the group consisting of meta- and para-amino-benzoyl, and the group produced by condensing a para-amino-benzoic acid on a meta- or para-amino-benzoyl group. Suitable alkyl and alkoxy groups are methyl, ethyl, propyl and even longer chain aliphatic groups and the alkoxy groups corresponding thereto. One para position of the meta-phenylene-diamine must be open for coupling. For good solubility, one or more solubilizing groups should be present in at least one of the nuclei of $Aryl_1$, and two solubilizing groups are desirable when the diazo base comprises a naphthalene nucleus. From the standpoint of substantivity the preferred dyes contain a polyazo combination as the $Aryl_1$ group and more than one amino-benzoyl-amino group also promotes good substantivity but good substantivity is obtained when only one of these conditions is present. Thus, in general, substantivity is increased by condensing a plurality of amino-aroyl groups on at least one amino of the meta-arylene-diamine radical, and by coupling to polyazo components. These dyes are more particularly described in our copending application Serial No. 152,364 filed July 7, 1937.

In the dyeing of textile fibres, the fibres are dyed with the above described compound, the compound is tetrazotized on the fibre and the dye is developed by coupling with an azo dye coupling component, such as beta-naphthol.

The invention is illustrated by the following examples but the invention is not limited to the illustrations.

Example 1

Five parts of cotton piece goods were dyed in the usual manner known to the art in a solution containing two-hundredths part of the compound represented by the formula

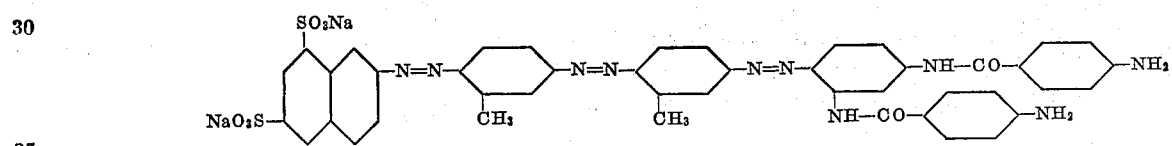

This dye was made by coupling one mole of meta-toluidine to one mole of diazotized 2-naphthylamine-6:8-disulfonic acid in a medium neutral to Congo red paper, salting out the product of coupling and separating the solid from the reaction medium. The product of coupling was then dissolved in sodium hydroxide solution, acidified and diazotized. The acidity of the diazo solution was reduced with sodium acetate, one mole of meta-toluidine was added and the mixture was gradually made weakly acid to litmus and finally weakly alkaline to litmus. When coupling was complete this product of coupling was separated. The latter product was suspended in hydrochloric acid solution, diazotized, made neutral to Congo red paper and coupled to one mole of meta-phenylene-diamine in sodium acetate medium. The product was isolated, slurried with water and condensed with 2 moles of para-nitro-benzoylchloride in medium made slightly alkaline with soda ash. The resulting slurry was treated with sodium disulphide in medium which was alkaline with soda ash until the two nitro groups were selectively reduced to amino groups. The resulting product was salted out and isolated as the sodium salt. After drying, it was a dark brown powder which was soluble in water.

After having dyed the cotton piece goods with the described dye, the dyed fabric was rinsed in cold water and put in 200 parts of water at 20° C. Three-tenths parts of sodium nitrite and four-tenths parts of sulfuric acid were added to the water and the dyed material was agitated in the solution for 15 minutes after which the goods were removed and rinsed with cold water. One-tenth part of beta naphthol was dissolved in 200 parts of water which contained one-twentieth part of caustic soda. The solution was stirred rapidly while immersing the piece goods therein. The goods were agitated for 15 minutes, rinsed in cold water and then dried. The dyeing was a brown shade. The probable formula of the dye on the fiber is

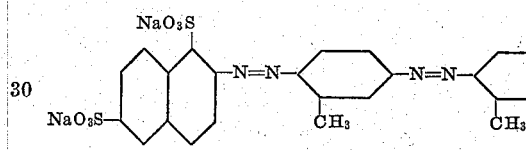

fastness to the exposures ordinarily encountered by dyed fabrics.

In the following examples the dyes were prepared and the dyeings were made and developed by methods similar to the methods disclosed in Example 1. The results obtained on textile fabrics of cotton and regenerated cellulose are shown. The dyes are indicated by the compounds which are used in their preparation. An arrow indicates coupling and point from the amine or azo compound which is diazotized toward the compound which is coupled thereto. The letters (PAB) stand for the para-amino-benzoyl group, (MAB) indicates the meta-amino-benzoyl group, MPD represents meta-phenylene-diamine, MTD represents meta-tolylene-diamine and letter-groups connected by straight lines represent condensation products. For example 2-naphthylamine,6:8-disulphonic acid ⟶

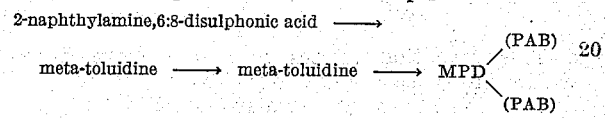

represents the dye shown in the first formula of Example 1. The solubilizing groups of the

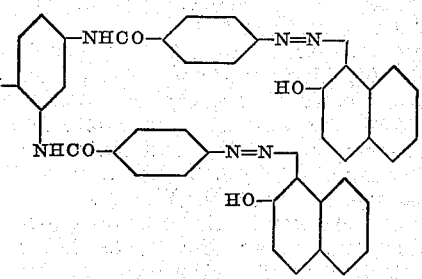

The developed dyeing had superior fastness to washing, good discharge properties and good direct dyes were present as their sodium salts as indicated in Example 1.

| | Diazo component | Developed with— | Shade of developed dye on cotton and regenerated cellulose |
|---|---|---|---|
| II | 2-naphthylamine-6:8-disulfonic acid ⟶ <br> (MAB)—(PAB) <br> MPD <br> (PAB) | Beta-naphthol | Yellow orange. |
| III | 2-naphthylamine-4:8-disulfonic acid ⟶ cresidine ⟶ <br> (MAB) MPD | ---do--- | Maroon brown. |
| IV | 2-naphthylamine-4:8-disulfonic acid ⟶ cresidine ⟶ <br> (MAB)—(PAB) <br> MPD <br> (PAB) | ---do--- | Reddish orange. |
| V | 2-naphthylamine-4:8-disulfonic acid ⟶ alpha naphthylamine ⟶ <br> (MAB)—(PAB) <br> MPD <br> (PAB) | ---do--- | Reddish brown. |
| VI | Metanilic acid ⟶ 1-naphthylamine-7-sulfonic acid ⟶ meta <br> toluidine ⟶ (MAB) MPD | ---do--- | Maroon brown. |
| VII | Metanilic acid ⟶ 1-naphthylamine-7-sulfonic acid ⟶ meta <br> toluidine ⟶ <br> (MAB)—(PAB) <br> MPD <br> (PAB) | ---do--- | Orange brown. |
| VIII | 2-naphthylamine-6:8-disulfonic acid ⟶ meta toluidine (PAB) ⟶ <br> (MAB)—(PAB) <br> MPD <br> (PAB) | ---do--- | Orange. |

| | | Diazo component | Developed with— | Shade of developed dye on cotton and regenerated cellulose |
|---|---|---|---|---|
| | IX | 2-naphthylamine-6:8-disulfonic acid ⟶ meta toluidine ⟶ meta toluidine ⟶ (MAB) MPD | do | Chocolate brown. |
| | X | 2-naphthylamine-6:8-disulfonic acid ⟶ meta toluidine ⟶ 1-naphthylamine-6-sulfonic acid ⟶ (MAB) MPD | do | Maroon brown. |
| | XI | 2-naphthylamine-6:8-disulfonic acid ⟶ meta toluidine ⟶ 1-naphthylamine-6-sulfonic acid ⟶<br>MPD⟨(MAB)—(PAB) / (PAB) | do | Reddish brown. |
| | XII | 2-naphthylamine-6:8-disulfonic acid ⟶ alpha naphthylamine ⟶ (MAB) MPD | do | Maroon brown. |
| | XIII | 2-naphthylamine-6:8-disulfonic acid ⟶ alpha naphthylamine ⟶<br>MPD⟨(MAB)—(PAB) / (PAB) | do | Reddish brown. |
| | XIV | 2-naphthylamine-6:8-disulfonic acid ⟶ cresidine ⟶ meta toluidine ⟶ (MAB) MPD | do | Maroon brown. |
| | XV | 2-naphthylamine-6:8-disulfonic acid ⟶ meta toluidine ⟶ cresidine ⟶ (MAB) MPD | do | Chocolate brown. |
| | XVI | 2-naphthylamine-6:8-disulfonic acid ⟶ alpha naphthylamine ⟶ meta toluidine ⟶ (MAB) MPD | do | Maroon brown. |
| | XVII | 2-naphthylamine-6:8-disulfonic acid ⟶ 2-5-dimethoxy aniline ⟶<br>meta toluidine ⟶ MPD⟨PAB / PAB | do | Violet brown. |
| | XVIII | 2-naphthylamine-6:8-disulfonic acid ⟶ meta toluidine ⟶<br>MPD⟨(PAB) / (PAB) | do | Reddish orange. |
| | XIX | 2-naphthylamine-6:8-disulfonic acid ⟶ meta toluidine ⟶<br>MPD⟨(MAB)—(PAB) / (PAB) | do | Yellow orange. |
| | XX | 2-naphthylamine-6:8-disulfonic acid ⟶ cresidine ⟶<br>MPD⟨(MAB)—(PAB) / (PAB) | do | Reddish orange. |
| | XXI | 2-naphthylamine-6:8-disulfonic acid ⟶ meta toluidine (PAB) ⟶ meta toluidine ⟶ (MAB) MPD | do | Reddish brown. |
| | XXII | 2-naphthylamine-6:8-disulfonic acid ⟶ meta toluidine ⟶ meta toluidine ⟶ (PAB) MPD | do | Chocolate brown. |
| | XXIII | 2-naphthylamine-6:8-disulfonic acid ⟶ cresidine ⟶ meta toluidine ⟶ (PAB) MPD | do | Maroon brown. |
| | XXIV | 2-naphthylamine-6-sulfonic acid ⟶ 1-naphthylamine-6-sulfonic acid ⟶ (MAB) MPD | do | Chocolate brown. |
| | XXV | 2-naphthylamine-6-sulfonic acid ⟶ 1-naphthylamine-6-sulfonic acid ⟶<br>MPD⟨(MAB)—(PAB) / (PAB) | do | Reddish brown. |
| | XXVI | 2-naphthylamine-6-sulfonic acid ⟶ 1-naphthylamine-6-sulfonic acid ⟶ meta toluidine ⟶ (MAB) MPD | do | Maroon brown. |
| | XXVII | 2-naphthylamine-6-sulfonic acid ⟶ 1-naphthylamine-6-sulfonic acid ⟶<br>MPD⟨(PAB) / (PAB) | do | Reddish brown. |
| | XXVIII | 2-naphthylamine-6-sulfonic acid ⟶ 1-naphthylamine-6-sulfonic acid ⟶<br>MPD⟨(PAB)—(PAB) / (PAB) | do | Red brown. |

| | Diazo component | Developed with— | Shade of developed dye on cotton and regenerated cellulose |
|---|---|---|---|
| XXIX | 2-naphthylamine-4:8-disulfonic acid ⟶ 2:5-dimethoxy aniline ⟶ MPD ⟨(PAB) / (PAB)⟩ | do | Bluish Bordeaux. |
| XXX | Benzidine ⟨2-amino-8-naphthol-3:6-disulfonic acid ⟶ (MAB) MPD / (MAB) MPD⟩ | do | Violet brown. |
| XXXI | Aminoazobenzene disulfonic acid ⟶ MPD ⟨(PAB)—(PAB) / (PAB)—(PAB)⟩ | do | Bright orange. |
| XXXII | 1-amino-8-naphthol-3:6-disulfonic acid ⟶ alpha naphthylamine ⟶ MPD ⟨(PAB) / (PAB)⟩ | do | Chocolate brown. |
| XXXIII | 1-amino-8-naphthol-3:6-disulfonic acid ⟶ cresidine ⟶ MPD ⟨(PAB) / (PAB)⟩ | do | Do. |
| XXXIV | 1-amino-8-naphthol-3:6-disulfonic acid ⟶ cresidine ⟶ MTD (PAB) | do | Violet brown. |
| XXXV | 2-naphthylamine-6:8-disulfonic acid ⟶ cresidine ⟶ meta toluidine ⟶ MPD sulfonic (PAB) | do | Maroon brown. |
| XXXVI | Benzidine ⟨MPD sulfonic acid (PAB) / MPD sulfonic acid (PAB)⟩ | do | Maroon brown. |
| XXXVII | 2-naphthylamine-6:8-disulfonic acid ⟶ cresidine ⟶ MTD (PAB) | do | Violet brown. |
| XXXVIII | Sulfanilic acid —alk.→ 2-amino-5-naphthol-7-sulfonic acid ⟶ MPD ⟨PAB / PAB⟩ | do | Bordeaux. |
| XXXIX | Aminoazobenzene mono sulfonic acid ⟶ 1-naphthylamine-6-sulfonic acid ⟶ MPD ⟨(PAB) / (PAB)⟩ | do | Bordeaux brown. |
| XL | 2-naphthylamine-6:8-disulfonic acid ⟶ aniline ⟶ meta toluidine ⟶ MPD ⟨(PAB) / (PAB)⟩ | do | Orange brown. |
| XLI | Benzidine ⟨acid↗ 1-amino-8-naphthol-3:6-disulfonic acid ←alk— aniline / ↘MPD ⟨(PAB) / (PAB)⟩⟩ | do | Red black. |
| XLII | Benzidine ⟨acid↗ 1-amino-8-naphthol-3:6-disulfonic acid ←alk— aniline / ↘(PAB) MPD⟩ | do | Red black. |
| XLIII | Benzidine ⟨acid↗ 1-amino-8-naphthol-3:6-disulfonic acid ←alk— aniline / ↘MPD ⟨(PAB)—(PAB) / (PAB)⟩⟩ | do | Red black. |

| | Diazo component | | | | Developed with— | Shade of developed dye on cotton cellulose |
|---|---|---|---|---|---|---|
| XLIV | 2-naphthylamine-6:8-disulfonic acid | → | meta-toluidine | → | ...do... | Brown. |
| | meta-toluidine | → | MPD (PAB) (PAB) | | | |
| XLV | 2-naphthylamine-6:8-disulfonic acid | → | meta-toluidine | → | 1-phenyl-3-methyl-5-pyrazolone. | Yellow brown. |
| | meta-toluidine | → | MPD (PAB) (PAB) | | | |
| XLVI | 2-naphthylamine-6:8-disulfonic acid | → | meta-toluidine | → | Acetoacetanilide | Orange. |
| | meta-toluidine | → | MPD (PAB) (PAB) | | | |
| XLVII | 2-naphthylamine-6:8-disulfonic acid | → | meta-toluidine | → | Meta tolylene diamine | Brown. |
| | meta-toluidine | → | MPD (PAB) (PAB) | | | |

As examples of satisfactory coupling components beta-naphthol, 1-phenyl-3-methyl-5-pyrazolone, aceto-acetanilide and meta-tolylenediamine are mentioned. From considerations of ease of manipulation, cost and general excellence of the developed dyes, beta-naphthol is preferred.

Since from the foregoing description of the invention it will be apparent to those skilled in the art that many embodiments of the invention may be made without departing from the spirit and scope thereof, it is to be understood that no limitations are intended in the annexed claims except those which are specifically recited or are imposed by the prior art.

We claim:

1. A dyestuff consisting of a plurality of radicals of an azo dye coupling component which are devoid of solubilizing groups coupled to the radical of an azotized amino azo compound which is represented by the formula

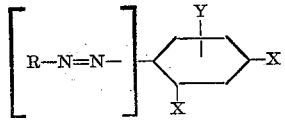

in which R—N=N— is the radical of an azo compound containing at least one radical from the benzene, naphthalene and benzidine series; one X is one of a group consisting of amino and the radical

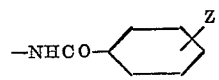

wherein Z is one of a group consisting of amino and amino-benzoylamino and the amino groups in said amino-benzoylamino radicals are in one of the positions meta and para to —CO—; and the other X is

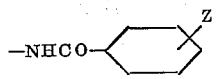

and Y is one of a group consisting of hydrogen, methyl and sulfonic acid, said dyestuff containing at least two solubilizing groups.

2. A product comprising a plurality of mols of the residue of an azo dye coupling component which is devoid of solubilizing groups, the residue after azotization of the sodium salt of a compound having at least two primary amine groups and azo bridges connecting the residue of said coupling component and the residue of said azotized compound, the azotizable compound being represented by the formula

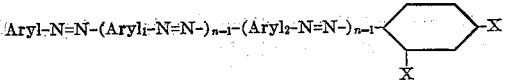

in which aryl is one of a group consisting of the residue after diazotization of a naphthylamine disulfonic acid, an amino-naphthol disulfonic acid, a naphthylamine sulfonic acid and an amino-benzene mono-sulfonic acid; the radicals Aryl₁ and Aryl₂ are each from the group consisting of the residues after diazotization and coupling of amino benzene, amino-benzene monosulfonic acids, amino benzoylamino toluene, naphthylamine, naphthylamine mono-sulfonic acids, and amino benzene substituted not more than twice by at least one of a group consisting of alkyl and alkoxy; $n$ is an integer not greater than 2; one X is one of a group consisting of amino and

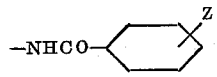

wherein Z is one of a group consisting of amino and amino-benzoylamino and the amino groups are in one of the positions meta and para to —CO—, and the other X is

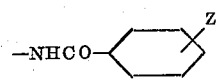

said compound having at least two solubilizing groups.

3. A product comprising a plurality of mols of the residue of an azo dye coupling component which is devoid of solubilizing groups, the residue after azotization of the sodium salt of a compound having at least two primary amine groups and azo bridges connecting the residue of said coupling component and the residue of said azotized compound, the azotizable compound being represented by the formula

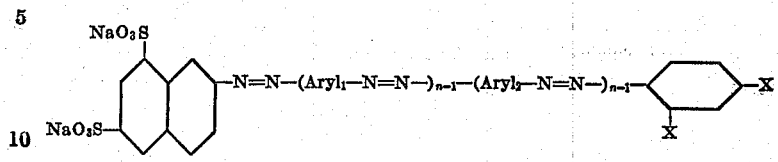

in which Aryl₁ and Aryl₂ are each from the group consisting of the residues after diazotization and coupling of amino benzene, amino-benzene monosulfonic acids, amino-benzoyl-amino toluene, naphthylamine, naphthylamine mono-sulfonic acids, and amino benzene substituted not more than twice by at least one of a group consisting of alkyl and alkoxy; $n$ is an integer not greater than 2; one X is one of a group consisting of amino and

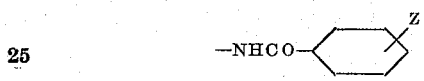

wherein Z is one of a group consisting of amino and amino-benzoylamino and the amino groups

are in one of the positions meta and para to —CO—, and the other X is

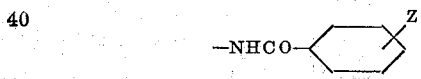

4. A dyestuff comprising a plurality of radicals of a coupling component of the group consisting of beta naphthol, 1-phenyl-3-methyl-5-pyrazolone, aceto-acetanilide and meta-toluylene diamine, the residue after azotization of the sodium salt of a compound having at least two primary amino groups and azo bridges connecting the residues of said coupling components and the residue of said azotized compound, the azotizable compound being represented by the formula

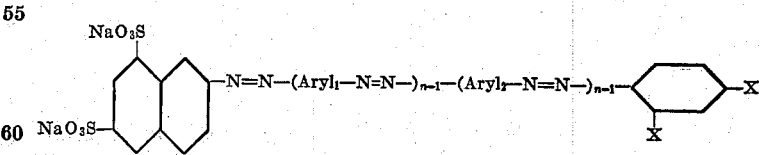

in which Aryl₁ and Aryl₂ are each from the group consisting of the residues after diazotization and coupling of amino benzene, amino-benzene mono-sulfonic acids, amino-benzoyl-amino toluene, naphthylamine, naphthylamine mono-sulfonic acids, and amino benzene substituted not more than twice by at least one of a group consisting of alkyl and alkoxy; $n$ is an integer not greater than 2; one X is one of a group consisting of amino and

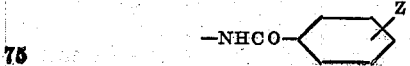

wherein Z is one of a group consisting of amino and amino-benzoylamino and the amino groups are in one of the positions meta and para to —CO—, and the other X is

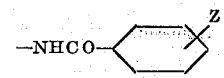

5. A dyestuff comprising a plurality of radicals of beta naphthol, the residue after azotization of the sodium salt of a compound having at least two primary amine groups and azo bridges connecting the residues of said coupling components and the residue of said azotized compound, the azotizable compound being represented by the formula

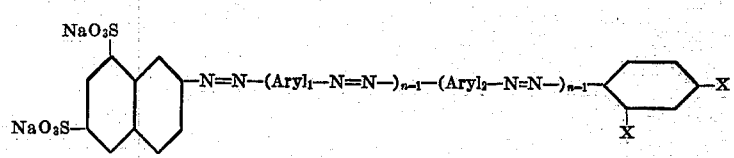

in which Aryl₁ and Aryl₂ are each from the group consisting of the residues after diazotization and coupling of amino benzene, amino-benzene mono-sulfonic acids, amino-benzoyl-amino toluene, naphthylamine, naphthylamine mono-sulfonic acids, and amino benzene substituted not more than twice by at least one of a group consisting of alkyl and alkoxy; $n$ is an integer not greater than 2; one X is one of a group consisting of amino and

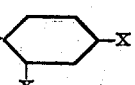

wherein Z is one of a group consisting of amino and amino-benzoylamino and the amino groups are in one of the positions meta and para to —CO—, and the other X is

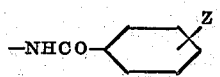

6. The compound represented by the formula

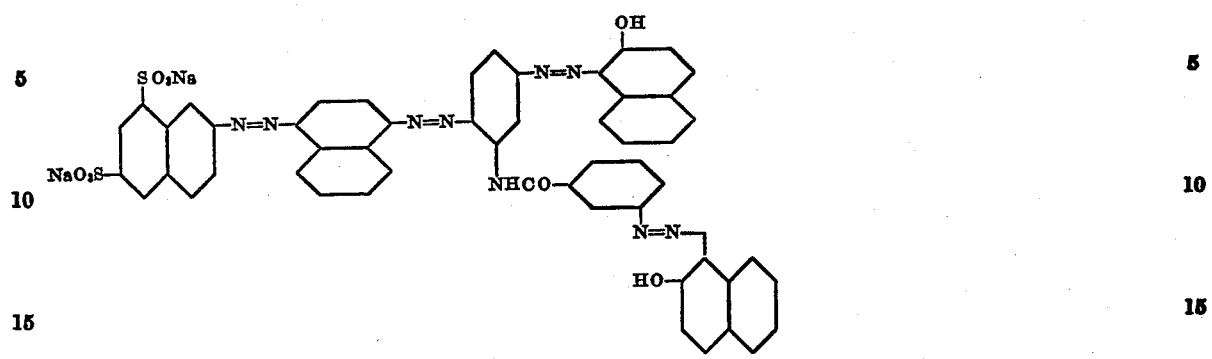

7. The compound represented by the formula

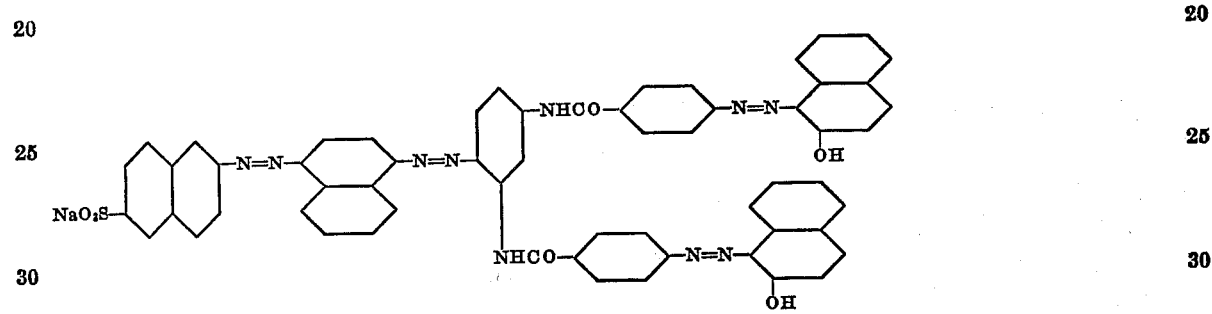

8. The compound represented by the formula

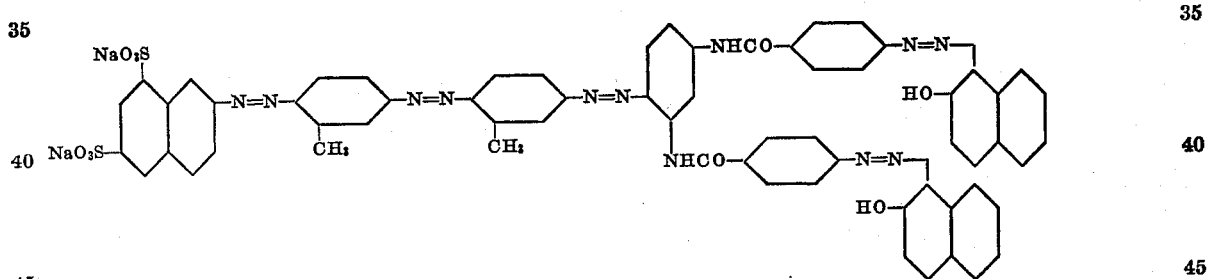

9. Textile fibers dyed with the dye of claim 1.
10. Textile fibers dyed with the dye of claim 2.
11. Textile fibers dyed with the dye of claim 3.
12. Textile fibers dyed with the dye of claim 4.
13. Textile fibers dyed with the dye of claim 5.
14. Textile fabric dyed with the dye of claim 8.

MARGARET R. MURPHY,
*Administratrix of the Estate of Arthur R. Murphy, Deceased.*
HENRY JORDAN.